United States Patent [19]

Craun et al.

[11] Patent Number: 5,252,637
[45] Date of Patent: Oct. 12, 1993

[54] LOW VOC, HIGH MOLECULAR WEIGHT EPOXY EMULSION COATINGS

[75] Inventors: Gary P. Craun, Berea; Daniel Bode, Cleveland, both of Ohio

[73] Assignee: The Glidden Company, Cleveland, Ohio

[21] Appl. No.: 900,924

[22] Filed: Jun. 12, 1992

[51] Int. Cl.$^5$ ................................................. C08K 3/20
[52] U.S. Cl. .................................... 523/406; 523/423; 525/107
[58] Field of Search ................... 523/423, 406; 525/107

[56] References Cited

U.S. PATENT DOCUMENTS 4,122,067  10/1978  Anderson ............................. 523/400
4,212,776   7/1980  Martinez et al. ..................... 523/456

Primary Examiner—Melvyn I. Marquis
Assistant Examiner—D. Aylward
Attorney, Agent, or Firm—Thomas M. Schmitz

[57] ABSTRACT

Coating compositions containing aqueous dispersions of higher molecular weight epoxy resin are produced by advancing the molecular weight of an aqueous dispersion of a low molecular weight epoxy resin having a number average molecular weight between about 360 and 2,000. The water dispersed low molecular weight epoxy resins are advanced in molecular weight by co-reaction with diphenol at temperatures above about 105° C. and at pressures above about 5 psig to produce the aqueous dispersed high molecular weight epoxy resin. The aqueous dispersed high molecular weight epoxy resin can be further copolymerized with ethylenic monomers, if desired, to produce an acrylic epoxy emulsion binder useful in protective coatings.

8 Claims, No Drawings

LOW VOC, HIGH MOLECULAR WEIGHT EPOXY EMULSION COATINGS

This invention pertains to high molecular weight epoxy resin emulsions produced by advancing the molecular weight of aqueous dispersed, low molecular weight epoxy resins to high molecular weight epoxy resin emulsions particularly useful as polymeric binders in protective surface coating compositions.

BACKGROUND OF THE INVENTION

Protective surface coatings are organic compositions applied to substrates and cured to form continuous films primarily to protect the substrate surface. Protective coatings ordinarily comprise a polymeric binder, pigments, and various additives, although some coatings contain little or no pigments and are known as clear coatings.

Epoxy resins are particularly desirable for use in surface coating materials as a vehicle or polymeric binder, where the epoxy resins advantageously provide toughness, flexibility, adhesion, and chemical resistance. Water-dispersed coating compositions containing epoxy resins are especially desirable for interior can coating compositions. Coatings for soft drink and beer cans, for instance, are critical due to taste sensitivity wherein such sanitary can coatings must not alter the product taste of canned beverages. Taste problems can occur in a variety of ways such as by leaching coating components into the beverage, or by adsorption of flavor by the coating, or sometimes by chemical reaction, or by some combination thereof.

In commonly assigned U.S. Pat. No. 4,212,781, a non-aqueous process is disclosed for modifying epoxy resin by reacting the epoxy resin with addition polymerizable monomer in the presence of at least 3% by weight of benzoyl peroxide (or the free radical peroxide initiating equivalent) based on monomer at a suitable reaction temperature. This reaction produces a non-aqueous reaction mixture containing an in-situ formed blend of resinous materials comprising an epoxy-acrylic copolymer mixture containing epoxy resin, a carbon graft epoxy-acrylic polymer, and associatively-formed ungrafted addition polymer. The in-situ polymerized monomers include carboxylic acid functional monomers to provide sufficient acid functionality in the reaction mixture to enable stable dispersion of the resulting reaction product in a basic aqueous medium.

To provide highly desirable epoxy-derived protective coatings, low molecular weight liquid epoxy resins are advanced in molecular weight to produce a high molecular weight epoxy resin preferably having a molecular weight above about 7000 and higher. High molecular weight epoxy resins are generally made by a fusion or organic solvent process in which low molecular weight epoxy resin, such as the diglycidyl ether of bisphenol A (DGEBPA), is coreacted with a lesser amount of bisphenol A to give a high molecular weight epoxy resin. For instance, a typical low molecular weight liquid epoxy resin having a molecular weight of about 380 can be advanced by reacting with bisphenol A at a weight ratio of about 66/33 weight parts epoxy resin/bisphenol A in about 15 weight parts of ethylene glycol monobutyl ether solvent and at a reaction temperature of about 175° C. in the presence of an ethyl triphenyl phosphonium acetate catalyst at atmospheric pressure, as described in U.S. Pat. No. 4,212,781, to produce a high molecular weight epoxy resin. The high molecular weight epoxy acrylic copolymers can be emulsified into water if first dissolved in an organic solvent to a low viscosity. Solvent levels of 50 to 100 parts per 100 parts of epoxy-acrylic by weight are generally required inasmuch lower solvent levels tend to render the solvent mixture difficult to disperse into water. More typical epoxy suspensions are disclosed in U.S. Pat. No. 4,409,288 and U.S. Pat. No. 4,177,177, which first disperse high molecular weight epoxy resin into solvent which in turn are dispersed into water followed by stripping of the organic solvent. The organic solvent must be removed from the aqueous emulsion by distillation, which is an expensive and time consuming process. In U.S. Pat. No. 4,122,067, a process is disclosed for reacting a polyepoxide with a dihydric phenol in water as a 40% to 95% aqueous dispersion and at temperatures between 80° C. and 100° C. using nonionic surfactants to produce water dispersed very low molecular weight epoxy resins. Dispersion at 40% to 75% are said to be unstable and resulting with large particles settling out of water while 75% to 95% dispersions result in much smaller particles but stable dispersions. Under these conditions, it has been found that mixtures of liquid epoxy and bisphenol coreact and advance the molecular weight only to about 1,000 where the reaction mixture becomes glassy and the reaction stops.

It now has been found that aqueous emulsions of low molecular weight epoxy resin can be advanced in molecular weights with bisphenols such as bisphenol-A while dispersed in water to produce small particle size stable aqueous dispersions of the high molecular weight epoxy resin in water. In accordance with the process of this invention, stabilized dilute aqueous emulsions (10% to 30%) of high molecular weight epoxy resins can be produced by reacting diepoxide with extender diphenol at temperatures of about 110° C. to 150° C. if reacted under pressures above about 10 psig in conjunction with nonionic and anionic stabilizers. The process of this invention provides a convenient and economical method for producing a stable high molecular weight epoxy resin emulsion directly at NV's which are suitable for interior can coating applications without the need for the cumbersome multi-step process of intermediate mixing with high levels of organic solvent, dispersion into water, and subsequent solvent stripping. The stable, high molecular weight, epoxy aqueous emulsion resulting from the process of this invention can be further coreacted directly with ethylenic unsaturated monomers, if desired, to produce epoxy emulsion copolymers suitable for use as a very low VOC (volatile organic compounds) aqueous dispersed coating. A further advantage of this invention is that considerably lesser amounts of acrylic or methacrylic acid monomer can be copolymerized with other ethylenic monomers to maintain water dispersibility and stability of the epoxy-acrylic copolymer in water. A further advantage relates to enhanced rheological properties including improved coating application properties as well as improved performance and sag resistance properties. In a further embodiment, carboxyl functional acrylic acids can be reacted with epoxy groups of advanced molecular weight, aqueous dispersed epoxy resins in intermediate stages to provide terminal double bond functionality which can be used to control molecular grafting during post reactions with acrylic monomer. These and other advantages of this invention will become more apparent by referring to the detailed description of the invention and the illustrative examples.

SUMMARY OF THE INVENTION

Briefly, low molecular weight liquid epoxy resins are dispersed into water along with difunctional phenols to provide a dilute stable aqueous emulsion comprising about 10% to 30% by weight of coreactants stabilized with minor amounts of nonionic polymeric stabilizer and anionic surfactant. The low molecular weight epoxy resin is advanced to high molecular weight epoxy resin in the presence of a catalyst at temperatures above about 105° C. at pressures above about 5 psig to produce a stable aqueous emulsion of high molecular weight epoxy resin. In a preferred aspect of the invention, the advanced molecular weight epoxy resin is maintained dispersed in water while further reacted with ethylenic monomers to produce stable epoxy copolymer emulsions useful in protective surface coatings.

DETAILED DESCRIPTION OF THE INVENTION

The invention is based on advancing the molecular weight of low molecular weight liquid epoxy resins emulsified in water to produce dilute aqueous emulsions of high molecular weight epoxy resins.

Low molecular weight, liquid epoxy resins are polyglycidyl ethers of bisphenol A having 1,2-epoxy equivalency between about 1.5 and 2.5, including mixtures of monoepoxides and diepoxides. Low molecular weight epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4' dihydroxy bisphenol, with the most preferred being bisphenol-A. Halohydrins including epichlorohydrin, dichlorohydrin, and 1,2-dichloro-3-hydroxypropane with the most preferred being epichlorohydrin. Preferred low molecular weight epoxy resins comprising the coreaction product of excess molar equivalents of epichlorohydrin and bisphenol-A produce predominantly an epoxy group terminated linear molecular chain of repeating units of diglycidyl ether of bisphenol-A containing from 1 to 4 repeating copolymerized units of diglycidyl ether of bisphenol-A. The most preferred linear, low molecular weight epoxy resins for increasing molecular weight in accordance with this process are polyglycidyl ethers of bisphenol-A having terminating 1,2-epoxide groups and an epoxy equivalent weight between 180 and 800, and a number average molecular weight from about 360 to 2,000 as measured by gel permeation chromatography (GPC). Commercially available low molecular weight epoxy resins for advancement in molecular weight include epoxy resins identified by trade number and average molecular weights as follows: Dow Chemical DER 333 (380); DER 661 (525); and Shell Chemical epoxy resins EPON 828 (380); EPON 836 (625); EPON 1001 (525) and Ciba Geigy linear epoxy resins GT-7013 (1400); GT-7014 (1500); GT 7074 (2000); and GT-256 (1200). If desired, minor amounts of higher molecular weight epoxy resins can be mixed with the low molecular weight epoxy resins prior to formation of the preliminary aqueous epoxy dispersion. Minor amounts of the higher molecular weight epoxy resins have been found to help maintain emulsion stability. Hence, the low molecular weight epoxy resin can comprise an epoxy resin mixture containing between about 0.1% and 10% higher molecular weight epoxy resin having a number average molecular weight above about 2,000 and between 2,000 and 20,000. Commercially available higher molecular weight epoxy resins including the following: Shell EPON 1007 (4500); and EPON 1009F (7000). Lesser minor amounts of mono and polyepoxides can also be added to control molecular structure of the advanced epoxy resin, if desired.

The low molecular weight epoxy resin mixture having a number average molecular weight below 2,000 is advanced in molecular weight by a difunctional coreactant such as bisphenols or diphenols. In preferred practice, excess molar equivalents of epichlorohydrin are reacted with bisphenol-A to produce epoxy resins where up to two moles of epichlorohydrin coreact with one mole of bisphenol-A to produce epoxide terminated, high molecular weight epoxy resin. Less than complete reaction or a ratio less than two moles reacted with one mole of bisphenol-A will produce difunctional epoxy resin along with monoepoxide chains terminated at one end with a bisphenol-A unit. The most common bisphenols are bisphenol-A, bisphenol-F, bisphenol-S, and 4,4'-dihydroxy bisphenol with the most preferred being bisphenol-A. Minor amounts of mono or poly phenols can be added if desired. Epoxy resins are coreacted with bisphenols at ratios typically between 1:2 and 2:1 equivalents of epoxy to phenol functionality with preferred ratios between about 4:5 and 5:4. Examples of phenols are phenol, o, m, or p-cresol, 2,4-xylenol, 3,4-xylenol, 2,5-xylenol, cardanol, p-tert-butylphenol and dihydric phenols such as o-dihydroxybenzene, m-dihydroxybenzene, and p-dihydroxybenzene, benzoquinone, and 3,5-dihydroxytoluene, as well as trihydric phenols such as 1,3,5-trihydroxybenzene and 1,2,3-trihydroxybenzene.

In accordance with the process of this invention, the low molecular weight epoxy resins and the difunctional phenol coreactant are first dispersed into water by using a combination of anionic and nonionic surfactants to produce an aqueous emulsion of reactants. Useful anionic surfactants include those hydrocarbons having anionic solubilizing groups such as carboxylates, sulfonates, sulfates, and phosphates. Among the anionic surfactants suitable for use in the present invention are the sulfates and sulfonates, such as sodium and potassium alkyl sulfates, aryl sulfates, and alkylaryl sulfates and sulfonates, including sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate; and sulfonated ethoxylated higher fatty alcohols as well as anionic surfactants such as potassium caprylate, potassium myristate, potassium palmitate, potassium stearate, potassium oleate, sodium decyl sulfonate, sodium dodecyl sulfonate, sodium tetradecyl sulfate, sodium decyl sulfate, sodium lauryl sulfate, potassium dehydroabietate, sodium rosinate, alkyl sodium sulfosuccinate esters, and the like. Anionic surfactants are ordinarily utilized at the level of about 0.1% to 5% based on the weight of epoxy plus difunctional coreactant. Dilute emulsions with greatly improved stability and cleanliness can be produced by using a combination of anionic surfactant with nonionic polymeric stabilizer. Useful nonionic polymeric stabilizers including ethylene oxide chains and hydroxyl groups hydrolyzed polyvinyl alcohol, hydroxyethyl cellulose, ethylene oxide copolymers of polypropylene glycol, as well as polyoxyethylene glycols reacted with polyglycidyl polyethers of polyhydric phenols. These non-ionic surfactants include alkylphenoxypoly(ethyleneoxy) ethanols having alkyl groups containing between about 4 to about 240 ethyleneoxy units, such as the heptylphenoxypoly(ethyleneoxy) ethanols, nonylphenoxypoly(ethyleneoxy) ethanols and dodecylphenoxypoly (ethyleneoxy ethanols, polyoxyalkylene derivatives of hexitol (including sorbitans, sorbides, mannitans and mannides) anhydride, partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; condensates of ethylene oxide with a hydrophobic base formed by condensing propylene oxide and propylene glycol; sulfur-containing condensates such as those prepared by condensing ethylene oxide with higher alkyl mercaptans, such as nonyl, dodecyl, or teradecyl mercaptan, or with alkylthiophenols wherein the alkyl substituent contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohols such as octyl, decyl, lauryl or cetyl alcohol. About 0.1% to 10% by weight nonionic stabilizer can be used based on the weight epoxy and diphenol reactants. Dilute aqueous emulsions useful in the invention contain between about 10%·and 30% by weight reactants dispersed into water.

Organic solvents can be used at low levels to reduce emulsion viscosity, if desired, and provide for more efficient emulsification of the low molecular weight epoxy resin. About 0% to 20% by weight or higher amounts of organic solvent based on the weight of coreactants can be added if desired. Small amounts of solvent can help to reduce the viscosity of the epoxy and difunctional phenol mixture although appreciable amounts of organic solvents will increase the VOC level. Suitable useful solvents include aromatics, such as xylene; the higher ketones, such as diisobutyl ketone; and similar organic solvents. More polar solvents such as butyl and hexyl cellosolve can be used in lesser amounts but tend to cause emulsion instability. In preferred compositions, ethylenic monomers are used as organic solvents during the epoxy advancement reaction whereupon the ethylenic monomers are subsequently copolymerized in a later addition copolymerization step.

First stage emulsification of epoxy and diphenol reactants is best done at elevated temperatures from about 50° C. to 95° C. to allow better emulsification of the epoxy and coreactive difunctional phenol. The low molecular weight diepoxide epoxy is advanced in molecular weight in dilute solution (10% to 30%) with diphenol and temperatures above about 105° C. and preferably between 110° C. and 150° C. and under pressure above 5 psig and preferably between 10 psig and 70 psig. Final emulsion solids can range from about 15% to 50% by weight of advanced epoxy resin with balance being water. Various hydroxide and tertiary amine catalysts can be used to control the epoxy/phenol reaction, such as metal hydroxides, and quaternary hydroxides, although tertiary amines are preferred, such as triethylamine, dimethyldodecylamine, benzyldimethylamine, and the like. Advancement of the low molecular weight epoxy resin seems to be fairly easy with tertiary amines such as triethyl amine, dimethyldodecyl amine, dimethylethanol amine, and the like, but the more hydrophobic amines are preferred over the hydrophilic dimethylethanol amine. Strong bases such as potassium hydroxide and quaternary hydroxides (benzyltrimethyl ammonium hydroxide) can also be used, but are not preferred. Phosphines, such as triphenyl phosphine can be used, although these catalysts can be unstable at higher temperatures in the presence of water and may cause discoloration. The presence of tertiary amines makes the emulsion slightly basic with a pH 8 to 9. Acidic pH's, less than 7, should be avoided, as epoxy resins can hydrolyze at a low pH below about 7. Based on the weight of epoxy plus phenol, about 0.1 to 5% catalyst is sufficient to give a good reaction rate at 125° C.

The process of advancing molecular weights of low molecular epoxy resin in an aqueous polymerization medium in accordance with this invention, provides a convenient method for producing high molecular weight epoxy resin aqueous emulsions which do not require solvent stripping to obtain low VOC coatings. Low molecular weight epoxy resin, such as diglycidyl ether of bisphenol-A, provides a good solvent for difunctional phenols suitable for advancing epoxy resins, and these solutions can be easily emulsified in water with common surfactants. The advanced molecular weight epoxy resin comprises an emulsified high molecular weight epoxy resin having a number average molecular weight above about 2,000 and preferably between about 2,000 and 20,000. Number average molecular weights ordinarily can be measured by gel permeation chromatography (GPC) as set forth in ASTM D 3016-72 and ASTM D 3593-80. The high molecular weight epoxy emulsion products can then be reacted with acrylic monomer to form epoxy/acrylic blends and copolymer grafts which are suitable for use as a low to zero VOC coating composition such as interior two piece can coating. Considerably lesser amounts of acrylic or methacrylic acid can be included in the emulsion copolymer process of acrylating the epoxy resin while still maintaining a stable aqueous emulsion of high molecular weight epoxy-acrylic copolymer.

In accordance with a preferred aspect of this invention, the preformed high molecular weight epoxy resin dispersed in water can be modified by copolymerizing ethylenic monomers in-situ with the aqueous dispersed high molecular weight epoxy resin to produce an aqueous polymeric blend of addition polymer and epoxy resin. The addition polymer portion of the epoxy-acrylic blend comprises polymerized ethylenically unsaturated monomers including functionally reactive and non-reactive monomers. Functional group reactive monomers include carboxyl functional monomers such as acrylic acid and lower alkyl substituted acrylic acids such as methacrylic acid and ethacrylic acid to provide carboxyl functionality means for stabilizing the epoxy-acrylic copolymer mixture in water. The preferred acrylic acid is methacrylic acid. Small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers can be nonreactive copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers include other $C_{1-15}$ alkyl acrylates esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily available monomers having vinyl unsaturation such as vinyl esters including vinyl acetate, vinyl propionate, vinyl butyrates, vinyl benzoates, vinyl isopropyl acetates and similar vinyl esters; vinyl halides, including vinyl chloride, vinyl fluoride, and vinylidene chloride; vinyl aromatic hydrocarbons including styrene, methyl styrenes and similar lower alkyl styrenes, chlorostyrene, vinyl toluene, vinyl naphthalene, divinyl benzene; vinyl aliphatic hydrocarbon monomers including alpha olefins such as ethylene, propylene, isobutylene, and cyclohex as well as conjugated dienes such as 1,3-butadiene, methyl-2-butadiene, 1,3-piperylene, 2,3-dimethyl butadiene, isoprene, cyclohexane, cyclopentadiene, and dicyclopentadiene; and vinyl alkyl ethers including methyl vinyl ether, isopropyl vinyl ether, n-butyl vinyl ether, and isobutyl vinyl ether.

In a preferred aspect of this invention, acrylic acid monomers including lower alkyl substituted acrylic acids can be pre-reacted with epoxy resins by esterifying the carboxyl group with an epoxy oxirane group to produce an epoxy-ester prepolymer or intermediate polymer containing pendant double bond unsaturation. Thereafter, the epoxy-ester prepolymer can be further reacted with ethylenic monomers by emulsion addition copolymerization of the pendant double bonds with ethylenic double bonds in the ethylenic monomers previously described. The resulting copolymer is an epoxy-ester graft copolymer.

In practice, the epoxy resin and the mixture of polymerizable ethylenic monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauryl peroxide, methyl ethyl ketone peroxide, chlorobenzoyl peroxide, and the like. Benzoyl peroxide is preferred as the free radical initiator for use in the practice of the presence invention. Other useful initiators include azobis initiators such as azobis derivatives of dimethylvaleronitrile, phenylmethane, isobutyronitrile, butyronitrile, cyclohexane carbonitrile, isobutyrate, trimethyl pentane and methyl propane. The amount of free radical catalyst is expressed in terms of percentage by weight of benzoyl peroxide based on the total weight of the polymerizable monomer at the temperature of use. The amount of peroxide catalyst should be at least about 0.5%, and preferably between 1% and 10% weight of benzoyl peroxide or other peroxide initiator based on monomer weight. The reaction temperature preferably is maintained in the range from about 30° C. to about 130° C., although the temperature may be adjusted within a relatively wide range to accommodate the reactivity of the monomer mixture. After the monomers are added, the reaction mixture is normally held for up to three hours at the reaction temperature to assure complete monomer conversions. The in-situ polymerization of the monomers produces an in-situ formed carboxyl functional polymer containing at least about 1%, and preferably between 5% and 25% of polymerized monoethylenically unsaturated carboxylic acid monomer based on the total weight of monomers copolymerized. The viscosity of the epoxy-acrylic polymeric blend can be controlled or adjusted by adding base such as tertiary amine, a metal hydroxide, or preferably ammonia. Preferably, polymerizable ethylenic monomers are used to replace solvent in the low molecular weight epoxy/bisphenol solution. Monomer can thus function as a solvent to lower viscosity and enhance emulsification, but then later polymerizes in the presence of the epoxy emulsion. Styrene is particularly well suited for this use as it can thermally polymerize during the epoxy advancement reaction without the use of a free radical initiator. Hence, zero VOC advanced epoxy/acrylic polymer blend emulsions can thereby be produced.

The epoxy-acrylic matrix polymeric blend composition comprises by weight between about 2% and 90% acrylic copolymer and between about 10% and 98% epoxy resin. If desired, the epoxy-acrylic blend can be mixed with a water dispersible crosslinking component such as aminoplast whereby the resulting composition can be heat cured to crosslink with carboxyl functionality of the epoxy-acrylic copolymer. On a polymer weight basis, the coating composition can contain between 0% and 15% (advantageously between 1% and 10%) aminoplast crosslinking resin mixed with between 85% and 100% of the above-indicated epoxy-acrylic matrix polymer composition.

Referring next to the aminoplast crosslinking resins, aminoplasts are melamine or melamine derivatives such as methylol melamine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 370, and Cymel 373 (all being products of American Cyanamid, Stamford, Conn., said aminoplasts being melamine based, e.g., hexamethoxy-methyl melamine for Cymel 303), and Beettle 80 (products of American Cyanamid which are methylated or butylated ureas). Other suitable aminoplast resins are of the type produced by reaction of aldehyde and formal guanamines; ammeline; 2-chloro-4,6-diamine-1,3,5-triazine; 2-phenyl-p-oxy-4,6-diamino-1,3,5-tri-azine; and 2,4,6-triethyl-triamino-1,3,5-triazine. The mono, di-, or tri-aryl melamines, such as 2,4,6-triphenyl-triamino-1,3,5-triazine, are preferred. Other aldehydes used to react with the amino compound to form the resinous material are crotonic aldehyde, acrolein, or compounds which generate aldehydes, such as hexamethylene-tetramine, paraldehyde, and the like. The water-dispersed coating compositions can be produced by mixing together the high molecular weight epoxy-acrylic copolymer with water-dispersed crosslinker. The aminoplast polymer can be dispersed into water by mechanical mixing.

The amount of water contained in the coating composition containing the epoxy-acrylic copolymer, and the aminoplast resin depends on the viscosity desired, which in turn, relates to the method of application. For spraying, preferably the coating composition contains between about 10% and 30% by weight polymeric solids relative to 70% to 90% water. For applications other than spraying, the aqueous polymeric dispersions can contain between about 10% and 40% by weight water. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating can be cured thermally at temperatures in the range from about 95° C. to about 235° C. or higher for time sufficient to effect complete curing as well as volatilizing of any fugitive component in the coating.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied should be as thick as 0.1 to 1 mil.

For a better understanding of the present invention, the following examples are provided. In this application, all parts are parts by weight, all percentages are weight percentages, and temperatures are degrees Centigrade, unless otherwise expressly noted.

EXAMPLE 1

A low molecular weight epoxy resin was advanced in molecular weight, but not in accordance with this invention, by the following procedure.

| Raw Material | Weight (grams) |
|---|---|
| Aromatic hydrocarbon solvent (Aromatic 2000) | 189 |
| Epoxy resin (Shell Epon 1009, E. eqv. wt. = 3000) | 18 |
| Bisphenol A | 376 |
| Epoxy resin (Shell Epon 828, E. eqv. wt. = 188) | 564 |
| Sodium $C_{14-16}$ olefin sulfonate surfactant (A246L) | 2.5 |
| Water | 100 |
| Water containing 0.5 grams triethyl amine catalyst | 100.5 |

The aromatic solvent, Epon 1009, bisphenol-A, and Epon 828 were heated moderately to dissolve the bisphenol-A and form a uniform mixture. The mixture was then added to the first addition of water containing surfactant and mixed in with a high shear Ross ME-100 emulsifier at 10,000 rpm for 5 minutes. Then the second addition of water containing triethyl amine was mixed with ordinary mixing for about 6 hours while heating at about 95° C. The NVM was 17.6. The product was a very low molecular weight epoxy resin of soft taffy consistency indicating the advancement reaction progress slowly and moderately. See Table I.

EXAMPLE 2

A low molecular weight was advanced in molecular weight in accordance with the process of this invention.

| Raw Material | Weight (grams) |
|---|---|
| Aromatic hydrocarbon (Aromatic 2000) | 189 |
| Epoxy resin (Shell Epon 1009, E. eqv. wt. = 3000) | 18 |
| Bisphenol A | 376 |
| Epoxy resin (Shell Epon 828, E. eqv. wt. = 188) | 564 |
| Sodium $C_{14-16}$ olefin sulfonate surfactant | 5 |
| Polyvinyl alcohol (mol. wt. 77,000) | 2 |
| Water | 200 |
| Water containing 1 gram triethylamine catalyst | 401 |

The aromatic solvent, Epon 1009, bisphenol-A and Epon 828 were heated moderately and then added to the water containing surfactant under high shear as in Example 1. Then the mixture was added to a pressure reactor along with the water containing triethylamine, where the controls were heated under ordinary mixing at a temperature of about 125° C. under 30 psig pressure for 4 hours. The NVM was 22.1%. The product was a high molecular weight epoxy resin of solid consistency. See Table I.

Melt viscosities of advanced epoxy resins produced in Examples 1 and 2 were compared with commercial epoxy resins measured at 175° C. on an ICI cone and plate viscometer and the comparisons are reported in Table 1.

TABLE 1

| Sample | Epoxy Eqv. Wt. | Viscosity (poise) |
|---|---|---|
| Epon 828 | 188 | less than 5 |
| Epon 1004 | 1000 | 57 |
| Epon 1009 | 3000 | over 500 |
| Example 1 | — | less than 5 |
| Example 2 | — | over 500 |

The foregoing Table I indicates that significantly higher molecular weight epoxy resins can be prepared as stable aqueous emulsion by the process of Example 2 under pressure and at temperatures above 100° C.

EXAMPLE 3

A low molecular weight epoxy resin was prepared according to Example 1, except that polyvinyl alcohol nonionic surfactant was omitted. The emulsion was not stable at 125° C. resulting in undesirable and useless agglomeration of the emulsion.

EXAMPLE 4

A low molecular weight epoxy resin was advanced in molecular weight according to the procedure of Example 2, except diisobutyl ketone was used as an organic solvent in the first step in place of the aromatic hydrocarbon. Reaction temperature was 125° C. and pressure was 30 psig. The result was a high molecular weight epoxy resin stably dispersed in water as indicated in Table 2.

EXAMPLE 5

A low molecular weight epoxy resin was advanced in molecular weight according to the procedure in Example 2, except that 1.5 grams of benzyl dimethyl amine was used as a catalyst instead of triethyl amine. Reaction temperature was 125° C. and pressure was 30 psig. A stable, aqueous dispersed, high molecular weight epoxy resin resulted as indicated in Table 2.

EXAMPLE 6

A low molecular weight epoxy resin was advanced in molecular weight according to Example 2, except that the reaction temperature under pressure of 50 psig was 140° C. for 4 hours. A stable, aqueous dispersed, high molecular weight epoxy resin resulted as indicated in Table 2.

TABLE 2

| Sample | Filtered Grit | NVM | ICI Cone & Plate 175° C. Viscosity (poise) |
|---|---|---|---|
| Ex. 3 | total agglomeration | | |
| Ex. 4 | 42 grams | 18.1% | >500 |
| Ex. 5 | 7.2 grams | 21.2% | >500 |
| Ex. 6 | 10.1 grams | 20.4% | >500 |

EXAMPLE 7

Low molecular weight epoxy resin was advanced in molecular weight in a manner similar to Example 2.

| | Raw Material | Weight (grams) |
|---|---|---|
| a) | Bisphenol-A | 479.4 |
| | Epoxy resin (Epon 828, E. eqv. wt. 188) | 752 |
| b) | Aromatic solvent (Aromatic 2000) | 33 |
| | Mixture (a) | 167 |
| c) | Surfactant (A246L) | 5 |
| | Polyvinyl alcohol (Airool 350) | 2 |
| | Water | 200 |
| d) | Water (deionized) | 400 |
| | Triethylamine | 1 |

The raw material components were processed according to Example 2 at a pressure of 30 psig and at a temperature of 125° C. for 4 hours.

EXAMPLE 8

Low molecular weight epoxy resin was advanced in molecular weight in a manner similar to Example 2, except that polyvinyl alcohol was replaced with 2 grams of hydroxy ethyl cellulose (Natrosol 250-MR). A stable aqueous emulsion of high molecular epoxy resin resulted at 20.1% NVM and 18.3 grams grit.

EXAMPLE 9

The intermediate from Ex. 6 was used to make an aqueous emulsion in a manner similar to Ex. 2 and was further copolymerized with ethylenic monomers as described hereafter.

300 g. From Ex. 6 above.
10 g. methacrylic acid
5 g. styrene
0.5 g. benzoyl peroxide Materials were mixed at 20° C. and warmed under nitrogen to 80° C. and held 5 hours. About 7 grams of 28% ammonia solution was added in 10 g. water and then cooled. Sample from Ex. 6 above had a Brookfield viscosity of 20 centipoise with a #3 spindle at 50 rpm. The resulting resin had a viscosity of 340 centipoise under the same conditions. No settling of viscosity change in either sample was noted after 1 month. The emulsion of this example was drawn down on A1 sheet with a #14 wire wound bar, and baked 2 minutes at 380° F. The cured film properties were as follows.

Film Properties

Appearance: Clear, glossy, smooth, hard, no crawling.
Sag: None noted.
Water Resistance: 30 minutes at 180° F. gave slight blush, but good adhesion over A1 and no film softening.

EXAMPLES 10 AND 11

The following low molecular weight epoxy resins were processed according to the method of Example 2, except for the surfactant combination which differs as indicated below:

| | Raw Material | Ex. 11 (grams) | Ex. 12 (grams) |
|---|---|---|---|
| a) | Aromatic solvent (Aromatic 2000) | 189 | 189 |
| | Epon 1009F | 18 | 18 |
| | Bisphenol-A | 376 | 376 |
| | Epon 828 | 564 | 564 |
| b) | polyvinyl alcohol | 4 | — |
| | Surfactant (A246L) | — | 10 |
| | Water | 200 | 200 |
| c) | Water containing 1 gm. triethylamine | 401 | 401 |

The (a) components are premixed into (b) components using high shear 10,000 rpm for 5 minutes at 90° C. Part (c) was then added and the mixture heated at 125° C. at 30 psig for 4 hours. The resulting resins had the following properties:

| | NVM | Grit |
|---|---|---|
| Ex. 11 | 0.5% NVM* | over 150 gm. polymer grit |
| Ex. 12 | 13.8% NVM* | 75 gm. polymer grit |

*Theoretical NVM should have been 22% if the components had reacted.

Although specific compositions are illustrated in the examples, the scope of the invention is not intended to be limited, except by the appended claims.

We claim:

1. A process for producing a coating composition containing a stable aqueous emulsion binder of high molecular weight epoxy resin and addition copolymer produced by the steps comprising:

dispersing into water low molecular weight epoxy resin having a number of average molecular weight between about 360 and 2,000 in the presence of ionic and anionic surfactants to provide an aqueous dispersion containing between about 10% and 30% by weight of said low molecular weight epoxy resin; and advancing the molecular weight of the low molecular weight epoxy resin by reacting the epoxy resin with a coreactive diphenol at temperatures above about 150° C. and at pressures above about 5 psig to provide an aqueous dispersed high molecular weight epoxy resin having a number of average molecular weight between about 2,000 and 20,000; and copolymerizing ethylenically unsaturated monomers in the aqueous dispersed high molecular weight epoxy resin by in-situ emulsion copolymerization to provide a stable aqueous emulsion binder of high molecular weight of epoxy resin and addition copolymer.

2. The process of claim 1 where the ethylenically unsaturated monomers comprise a carboxyl functional ethylenic monomer, and said carboxyl functional monomer is esterified with the high molecular weight epoxy resin to produce an epoxy-ester polymer containing pendant double bond unsaturation.

3. The process of claim 2 where additional ethylenic monomers are copolymerized in-situ with the epoxy-ester to coreact with pendant double bonds and produce a graft acrylic epoxy-ester copolymer.

4. The process of claim 1 where the ethylenic monomers are copolymerized by addition copolymerization to produce an aqueous emulsion mixture of high molecular weight epoxy resin and addition copolymer.

5. The process of claim 1 where the emulsion copolymerized monomers plus high molecular weight epoxy resin comprises a matrix polymeric binder, and the copolymerized monomer comprises by weight between 2% and 90% based on the weight of the matrix polymeric binder.

6. An aqueous dispersed coating composition containing a high molecular weight epoxy resin binder and addition copolymer, the binder comprising:

an aqueous dispersion of a high molecular weight epoxy resin having a number average molecular weight between about 2,000 and 20,000 and produced by advancing the molecular weight of a low molecular weight epoxy resin having a number average molecular weight between 360 and 2,000 and dispersed into water in the presence of ionic and anionic surfactants to provide a dilute aqueous dispersion containing between about 10% and 30% by weight said low molecular epoxy resin, where the low molecular weight epoxy resin is advanced in molecular weight by coreaction with a diphenol at temperatures between about 110° C. and 150° C. and pressures between about 10 psig and 70 psig for time sufficient to produce said high molecular weight epoxy resin; and said high molecular weight epoxy resin containing an emulsion copolymer of emulsion copolymerized ethylenic monomers produced by in-situ emulsion copolymerization of said ethylenic monomers with the high molecular weight epoxy resin to produce a matrix binder for the coating containing between about 10% to 98% by weight high molecular weight epoxy resin.

7. The aqueous coating composition of claim 6 where the matrix binder comprises an aqueous emulsion of an epoxy-acrylic graft copolymer.

8. The aqueous coating composition of claim 6 where the matrix binder comprises an aqueous emulsion mixture of high molecular weight epoxy resin and addition copolymer of copolymerized monomers.

* * * * *